US006626456B2

(12) United States Patent
Terbu et al.

(10) Patent No.: US 6,626,456 B2
(45) Date of Patent: Sep. 30, 2003

(54) APPARATUS AND METHOD FOR INFLATABLE CURTAIN WRAP

(75) Inventors: John Terbu, Clinton, UT (US); Daniel T. O'Neill, Brighton, MI (US)

(73) Assignee: Autoliv ASP, Inc., Odgen, UT (US)

( * ) Notice: Subject to any disclaimer, the term of this patent is extended or adjusted under 35 U.S.C. 154(b) by 0 days.

(21) Appl. No.: 09/892,387

(22) Filed: Jun. 26, 2001

(65) Prior Publication Data

US 2002/0195803 A1 Dec. 26, 2002

(51) Int. Cl.[7] .............................................. B60R 21/22
(52) U.S. Cl. .............................. 280/728.2; 280/730.2; 280/743.1
(58) Field of Search ..................... 280/728.2, 730.2, 280/743.1, 732, 728.1

(56) References Cited

U.S. PATENT DOCUMENTS

| | | | | |
|---|---|---|---|---|
| 4,348,037 A | * | 9/1982 | Law et al. ................ | 280/728.3 |
| 5,498,023 A | * | 3/1996 | Adams et al. ............ | 280/728.2 |
| 5,676,393 A | * | 10/1997 | Rose ....................... | 280/728.2 |
| 5,730,463 A | * | 3/1998 | Fisher et al. ............. | 280/743.1 |
| 5,765,867 A | * | 6/1998 | French .................... | 280/743.1 |
| 5,823,566 A | * | 10/1998 | Manire .................... | 280/743.1 |
| 5,899,485 A | * | 5/1999 | Folsom et al. ........... | 280/728.2 |
| 5,899,486 A | * | 5/1999 | Ibe .......................... | 280/728.2 |
| 6,106,006 A | * | 8/2000 | Bowers et al. ........... | 280/730.2 |
| 6,145,879 A | * | 11/2000 | Lowe et al. .............. | 280/743.1 |
| 6,293,581 B1 | * | 9/2001 | Saita et al. ............... | 280/730.2 |
| 6,336,651 B1 | * | 1/2002 | Mramor et al. .......... | 280/728.2 |
| 6,364,349 B1 | * | 4/2002 | Kutchey et al. ......... | 280/730.2 |
| 6,371,512 B1 | * | 4/2002 | Asano et al. ............. | 280/728.2 |

FOREIGN PATENT DOCUMENTS

GB     2309942     2/1996

* cited by examiner

Primary Examiner—Paul N. Dickson
Assistant Examiner—Joselynn Sliteris
(74) Attorney, Agent, or Firm—Sally J. Brown; James D. Erickson (57) ABSTRACT

A novel airbag device, especially well suited to protect occupants of a vehicle from lateral impact is described. The airbag device includes an inflatable curtain and a wrap having a first edge and a second edge. The edges are configured such that the wrap can be secured about the curtain when the curtain is in a folded state. One edge of the wrap includes a securement portion which may be two-sided tape secured along an edge of the wrap. The securement portion allows the edges of the wrap to be secured to each other. Attachment tabs extend from an edge of the curtain through slots in the wrap to facilitate attachment of the curtain airbag to a vehicle as part of an airbag system. The curtain is folded into a predetermined configuration. The wrap is then secured about the curtain by removing a backing of the two-side tape, cinching the wrap about the curtain, and then securing one edge of the wrap to the second edge about the curtain.

35 Claims, 6 Drawing Sheets

APPARATUS AND METHOD FOR INFLATABLE CURTAIN WRAP

BACKGROUND

1. The Field of the Invention

The present invention relates to a wrap for enclosing an inflatable curtain. More specifically, the present invention relates to a novel inflatable curtain wrap and method for enclosing the curtain within the wrap.

2. The Relevant Technology

Inflatable safety restraint devices, or "airbag restraints," are mandatory on most new vehicles. Airbag restraints commonly contain a collision sensor, and inflator, and a curtain airbag. In the event of an accident, the collision sensor within the vehicle, such as an accelerometer, measures abnormal deceleration and triggers the inflator. The inflator is connected to the curtain airbag which is typically housed in the steering wheel on the driver's side of a vehicle and in the dashboard on the passenger side of a vehicle. Curtain airbags are normally housed in an uninflated and folded condition to minimize space requirements. Upon receipt of the signal from the collision sensor, the inflator rapidly produces a quantity of inflation fluid or gas which fills the curtain and protects the passenger from harmful impact with the interior of the car.

Airbags have also been developed in response to the need for passenger protection from lateral impacts with the side of a vehicle's interior. This situation might occur when another vehicle collides with the side of the car, or when the car loses control and rolls over causing the side of the car to repeatedly impact the ground. Side impact airbags are designed to prevent the head of a vehicle occupant from emerging through the window opening or from colliding with a collision surface at the side of the vehicle. The shape of the curtain airbag generally conforms to the shape of the window area or side of the car adjacent the passenger's torso. Side inflatable curtains are typically attached to, or housed within the roof rail of the vehicle behind the headliner.

Other airbag systems provide a package or housing in which the folded curtain airbag is enclosed before it is secured to the vehicle interior. These retention devices also suffer many disadvantages. Often they are bulky and inflexible and do not readily conform to the space requirements or attachment limitations of the vehicle's interior components. One type of retention device that seeks to overcome these disadvantages is a fabric cylinder, commonly referred to as a "sock."

A disadvantage with the pull through sock retention device is that it requires costly equipment to perform all of the required packaging steps. This adds to the cost of airbag manufacturing and installation. Further, some prior art sock systems require manual labor to pull the curtain airbag through the sock which creates ergonomic health problems for the laborers which further drives up costs.

Another disadvantage of sock retention devices is that the wrap or sock includes a fixed diameter at either end of the cylindrically shaped sock and along its length. Accordingly, the sock is not adjustable and the folded airbag cannot be compressed to its smallest possible size in the folded state. Thus, in side airbag configurations where space is at a premium, prior art socks limit the ability of the airbag system to maximize space efficiencies.

Accordingly, a need exists for an curtain airbag wrap that accommodates the size, space, and timing considerations of side vehicle interior deployment. Additionally, a need exists for such a curtain wrap and method of curtain retention which would allow the curtain to efficiently deploy. Furthermore, a need exists for such a curtain airbag wrap and method which would retain the curtain airbag in a desired configuration during the wrapping process such that the final state is more robust. Still further, a need exists for a curtain airbag wrap which requires fewer steps to wrap and that would allow for further compression of the curtain airbag in its folded state. Such a curtain airbag wrap and method of wrapping is disclosed and claimed herein.

BRIEF SUMMARY OF THE INVENTION

The apparatus of the present invention has been developed in response to the present state of the art, and in particular, in response to the problems and needs in the art that have not yet been fully solved by currently available inflatable curtain wraps and wrapping methods. Thus, it is an overall objective of the present invention to provide a curtain wrap and method for wrapping an inflatable curtain to provide efficient deployment, better overall effectiveness, and more cost efficient production than was possible with prior art airbag systems.

To achieve the foregoing and other objectives, and in accordance with the invention as embodied and broadly described herein, an airbag system is provided having an inflatable curtain with a first edge and a second edge. A curtain wrap may be substantially as long as the curtain and configured to at least partially enclose the inflatable curtain. In one embodiment, the wrap is longitudinally attached to the curtain along or near the first edge of the curtain. A first edge of the wrap may be configured to be attached near a second edge of the wrap about the curtain when the curtain is in a folded state. In this configuration, the curtain and wrap are integrated.

The first edge of the wrap preferably includes a securement portion to facilitate attachment of the first edge of the wrap adjacent a second edge of the wrap. In one presently preferred embodiment, the securement portion includes two-sided tape. A first side of the two-sided tape may be secured longitudinally near the first edge of the wrap. The second side of the two-sided tape may be configured to be secured near the second edge of the wrap. In this configuration, the diameter of the wrap is not fixed, and the folded curtain does not need to be pulled through a fixed diameter wrap. Additionally, the wrap of the present invention may be cinched tight about the folded curtain before the edges of the wrap are secured to each other about the curtain, thereby allowing the present invention to maximize space efficiencies.

The wrap includes a tear seam running longitudinally along the wrap and positioned between the securement portion of the wrap and the first edge of the wrap. The tear seam allows the curtain to burst through the wrap at the tear seam and into a vehicle interior upon inflation. In one embodiment, the curtain includes at least one attachment tab, extending from the first edge of the curtain, which allows the curtain airbag to be attached to a vehicle interior. In this configuration, the wrap may include at least one slot configured to receive the attachment tab of the curtain therethrough. This allows the attachment tab to be accessible after the curtain is in a wrapped state. It will be appreciated that the wrapping procedure of the present invention is simpler and thus more cost-effective, requiring less equipment than the prior art.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6A, is not intended to limit the scope of the invention, as claimed, but is merely representative of presently preferred embodiments of the invention.

Figure 1:
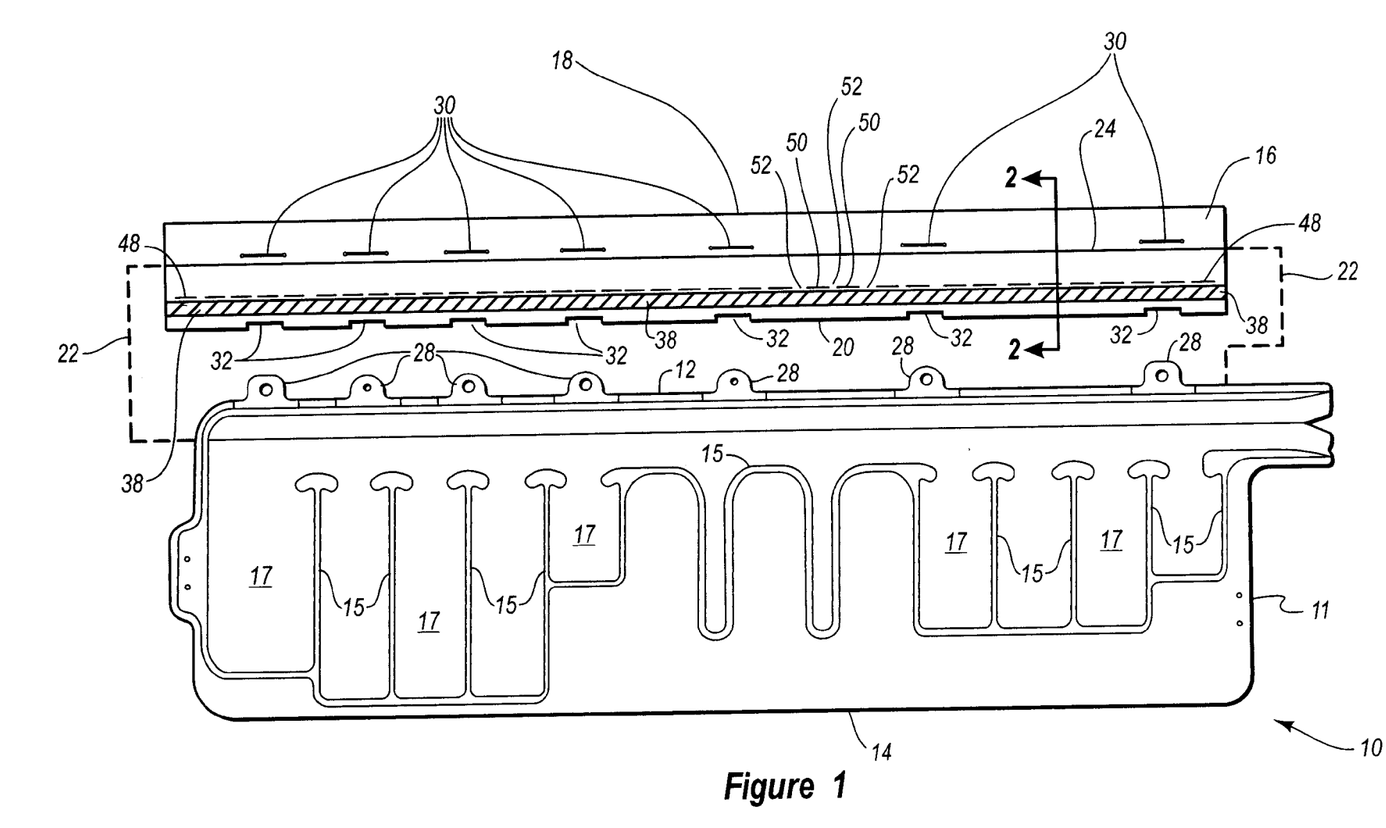
FIG. 1 is an exploded plan view of a curtain airbag and wrap of the present invention.

With particular reference to FIG. 1, an airbag device utilizing the present invention is generally designated at 10. The airbag device 10, includes an inflatable curtain 11 having a first edge 12 and a second edge 14. The curtain 11 typically is configured of 2 pieces of materials attached to each other by materials known in the art. The pieces may be attached to each other at seams 15 to form distinct chamber 17, each of which will hold inflation fluid such as gas produced by an inflator (not shown).

The airbag device 10 also includes a wrap 16 having a first edge 18 and a second edge 20. The wrap 16 is preferably configured to at least partially enclose the inflatable curtain 11 in a folded state. The wrap 16 may be substantially as long as the curtain 11. In the preferred embodiment of the curtain 11 illustrated in FIG. 1, the wrap 16 is attached to the curtain 11 along a stitch line 22. The wrap 16 may be longitudinally attached to the curtain 11 adjacent a centerline portion 24 of the wrap 16 and near the first edge 12 of the curtain 11. The wrap 16 is configured and attached to the curtain 11 to permit the first edge 18 of the wrap to be attached near the second edge 20 of the wrap 16 about the curtain 11 when the curtain 11 is in a folded state.

In one presently preferred embodiment, the wrap 16 is sewn to the curtain 11 using nylon thread. In the illustrated invention, number 46 nylon thread is used at six to eight stitches per inch. The stitch line 22 of the wrap 16 and curtain 11 is between about one millimeter and about ten millimeters from the first edge 12 of the curtain 11. In a presently preferred embodiment, the stitch line 22 is about two and half millimeters from the first edge 12 of the curtain 11. It will be appreciated by those of skilled in the art that the wrap 16 may be attached to the curtain 11 in a variety of ways, including but not limited to, adhesive bonding, chemical bonding, heat welding, RF welding, and swaging. It will further be appreciated that the wrap 16 may be positioned about the curtain 11, without being attached to the curtain 11, and still practice the teachings of this invention.

The curtain 11 and wrap 16 fabric may be constructed of suitable materials including, but not limited to woven polymeric yarn fibers, such as nylon or polyester. Nylon 6 and nylon 6—6 are examples of preferred yarn materials. Other conventional yarns can be used in the fabric layer, typically having a denier ranging from about 210 to 630. The weave density will vary depending upon the desired fabric permeability and the yarn denier. For a typical 420-denier yarn, the weave density will range from 46×46 yarns per inch to 53×53 yarns per inch. Other suitable materials may include non woven nylon, including Cerex PBN II at 3 ounces per square yard. The curtain 11 and wrap fabric may be coated with an impermeable coating on the interior surface (not shown) of the fabric. Currently preferred coating materials include, but are not limited to, urethanes and silicone/urethanes. Other known and novel fabric coating materials can be used.

In one embodiment, the curtain 11 has tensile strength of at least 500 N. In a presently preferred embodiment, the curtain 11 and the points of attachment between the curtain 11 and the wrap 16 have tensile strengths of 1400 N. Accordingly, the curtain 11, wrap 16, and attachment points are robust. As will be discussed in greater detail below, with the wrap 16 attachment to the curtain 11, the curtain 11 can be folded and conveniently secured within the wrap 16 without the need for being pulled through a fixed-diameter sock.

The curtain airbag 11 includes at least one, and preferably several, attachment tabs 28. The attachment tabs 28 extend beyond the first edge 12 of the curtain airbag 11 so that after the curtain airbag 11 is in a fully folded state, the curtain 11 can be attached to the roof rail or other interior component (not shown) of the vehicle. The wrap 16 includes at least one and preferably a same number of slots 30 as the number of attachment tabs 28. The slots 30 are configured to receive the attachment tabs 28 therethrough. It will be appreciated that in this configuration, the curtain 11 may be folded and enclosed by the wrap 16, but still leaving the attachment tabs 28 accessible for attachment of the curtain 11 to the interior of the vehicle. The attachment tabs 28 also allow the curtain 11 to be inflated without interference from whatever means may be used to attach the curtain 11 to the vehicle. In other embodiments, the means for attaching the curtain 11 to the vehicle may include tabs or attachment points that are connected or part of the wrap 16 itself. In this configuration, there would be no need for the slots 30.

The curtain 11 may also include one or more notches 32 configured along the second edge 20 of the wrap 16. The notches 32 are preferably aligned with the slots 30 in the wrap 16 to permit the attachment tabs 28 to substantially align with and be positioned substantially within the notches 32 when the wrap 16 is secured about the curtain 11. As can best be seen by reference to FIG. 6, this configuration allows for easier access to the attachment tabs 28 after the curtain 11 is enclosed within the wrap 16.

Figure 2:
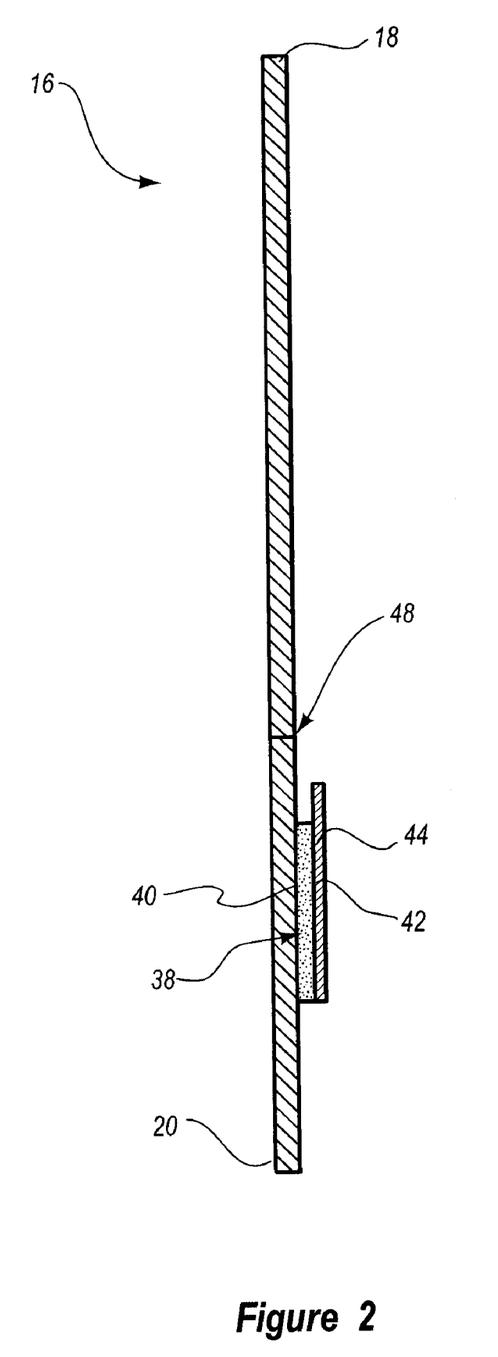
FIG. 2 is a side plan view of Section 2—2 of the wrap of FIG. 1.

Referring now to FIGS. 1 and 2, the wrap 16 of the present invention may include a securement portion 38 to facilitate attachment of the first edge 18 of the wrap 16 adjacent a second edge 20 of the wrap 16 about the curtain 11. The securement portion 38 may be positioned longitudinally near the second edge 20 of the wrap 16. In one preferred embodiment, the securement portion 38 comprises two-sided tape 38. A first side 40 of the two-sided tape 38 may be secured near the second edge 20 of the wrap 16, and a second side 42 of the two-sided tape 38 may be configured near the first edge 18 of the wrap 16. The two-sided tape 38 may contain a backing 44 removably attached to the second side 42 of the two-sided tape 38 for convenience prior to securing the first edge 18 of the wrap 16 to the second edge 20 of the wrap 16.

In a preferred embodiment of the present invention, the two-sided tape is TESA 4698 Adhesive that is 20 millimeters wide with a 25 millimeter wide backing 44 extending beyond the width of the tape 38 to make it easy to peal off when securing the edges 18, 20 of the wrap 16 to each other. The two-sided tape 38 is preferably acrylic-based, although some rubber-based tapes may be effective.

The two-sided tape 38 may be configured in a variety of ways to secure the wrap 16 about the curtain 11 according to the teachings of this invention. One such way may include securing two-sided tape at spaced intervals along the first edge 18 or the second edge 20 of the wrap. Additionally, the tape 38 may be positioned such that one or both of the edges 18, 20 of the wrap 16 may be secured to a portion of the curtain 11 itself to substantially enclose the curtain 11 instead of being secured to each other. For example, the securement portion 38 may allow the wrap 16 to be attached to the curtain adjacent the first edge 18 of the wrap 16 with the second edge 20 of the wrap being secured adjacent the first edge 12 of the curtain 11 or even to the vehicle interior. Of importance is that wrap 16 not interfere with the inflation of the curtain 11 after the curtain 11 has burst through the wrap 16 as discussed in more detail below. Other means may be utilized to secure the wrap 16 about the curtain 11, including adhesive bonding, chemical heat welding, RF welding, sewing, and swaging.

The wrap 16 may include a tear seam 48 running longitudinally along the wrap 16. The tear seam 48 may be positioned between the securement portion 38 of the wrap 16 and the first edge 18 of the wrap 16. The tear seam 48 is configured to permit the curtain 11 to burst through the wrap 16 at the tear seam 48 and into a vehicle upon inflation to a predetermined level. The tear seam 48 has a tear strength of between about 10 pounds and about 50 pounds, and preferably about 30 pounds under tensile load. In a presently preferred embodiment, the tear seam 48 is a straight perforation that includes a plurality of 9 millimeter cuts 50 separated by 3 millimeter fabric bridges 52. In other embodiments, the tear seam is created by scoring the wrap 16 to a desired depth. The tear seam may also be created by annealing the wrap 16 to weaken the wrap 16 at strategic "break through" locations.

Figure 3:
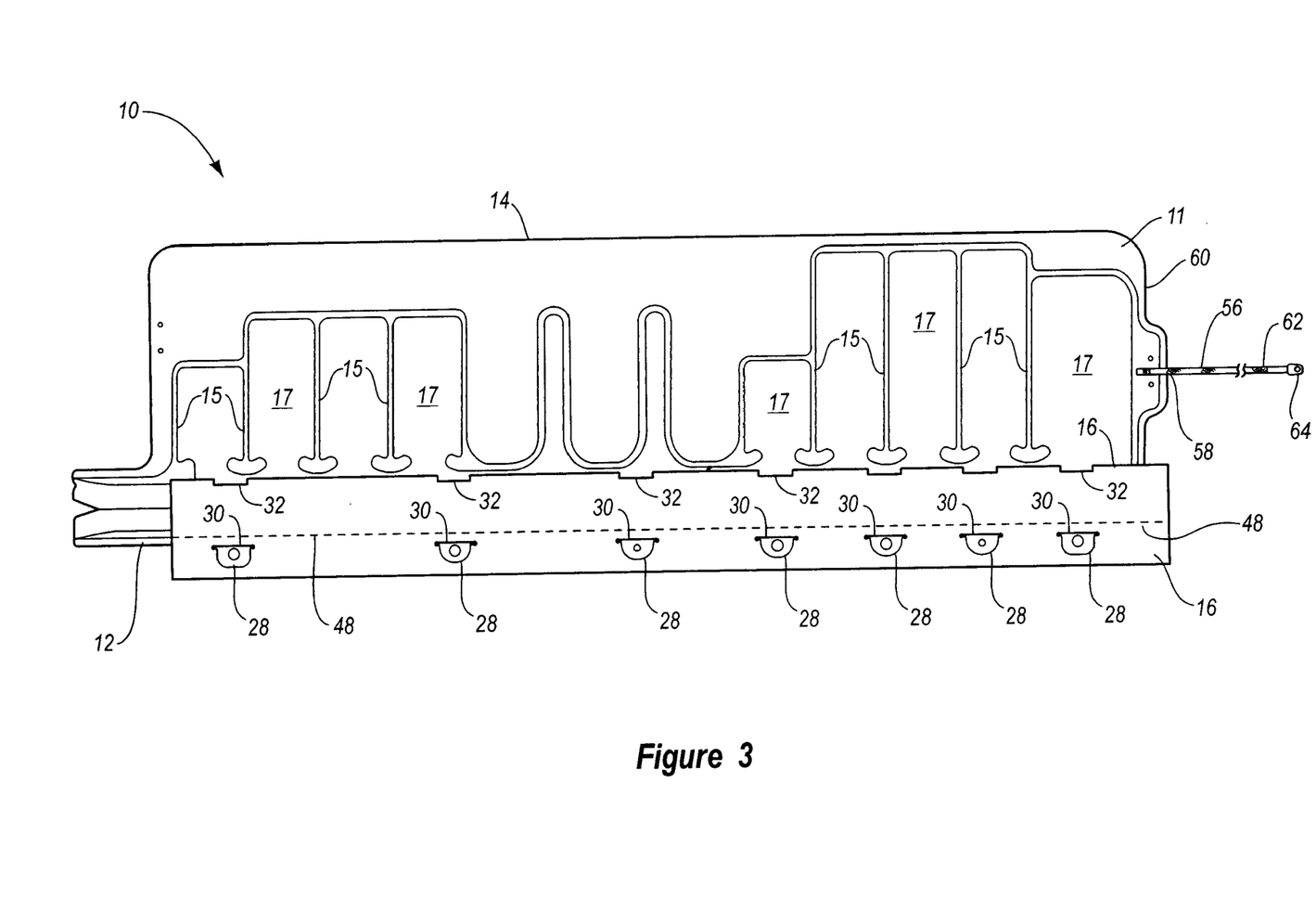
FIG. 3 is a plan view of the curtain airbag of FIG. 1 with the wrap attached to the curtain and a tether extending from the curtain.
Figures 4, 4A:
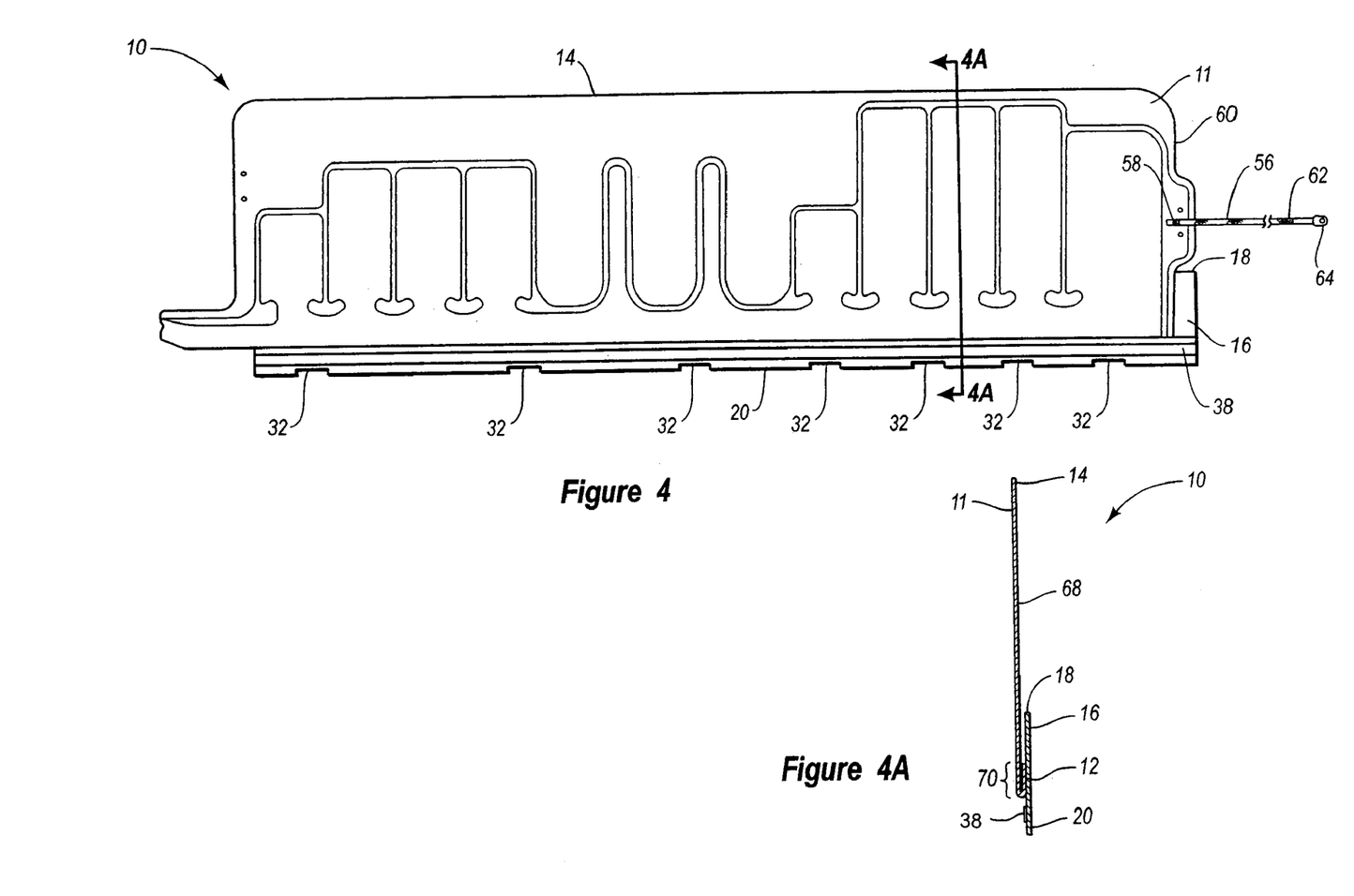
FIG. 4 is a plan view of the curtain airbag of FIG. 3.
FIG. 4A is a side plan view of Section 4A—4A of the curtain airbag of FIG. 4.
Figures 5, 5A:
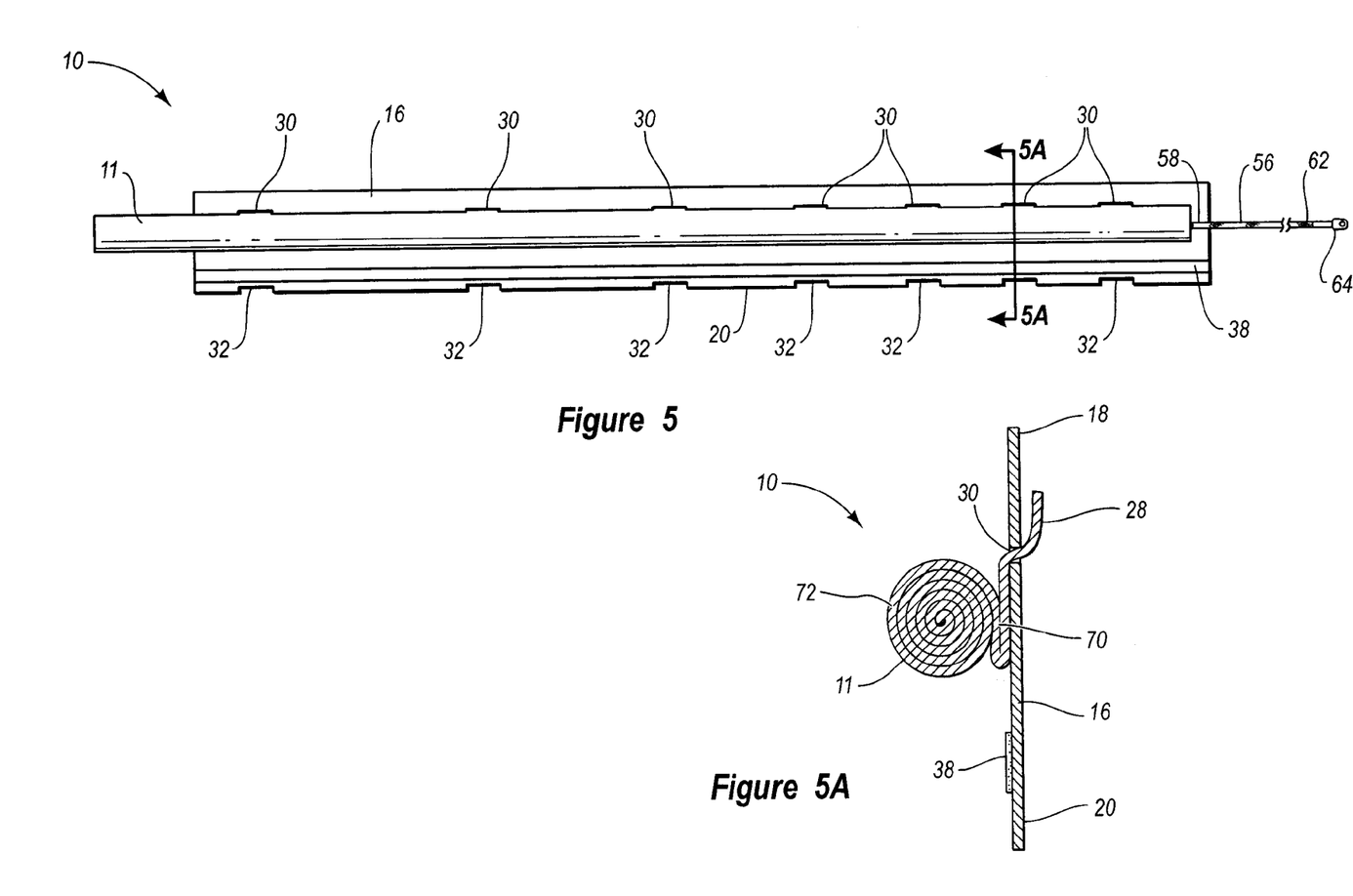
FIG. 5 is a plan view of the curtain airbag of FIG. 3 with the curtain airbag in a rolled state.
FIG. 5A is a side plan view of the Section 5A—5A of the curtain airbag of FIG. 5.
Figure 6:
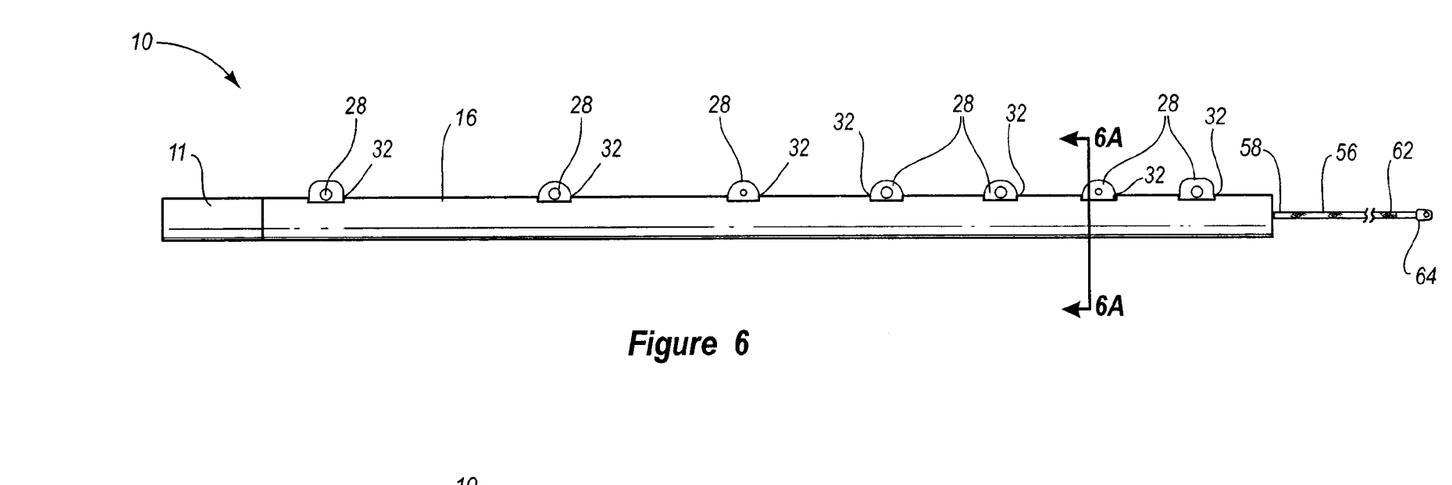
FIG. 6 is a plan view of the curtain airbag of FIG. 3 with the curtain airbag in a rolled state and the wrap positioned about the curtain airbag.
Figure 6A:
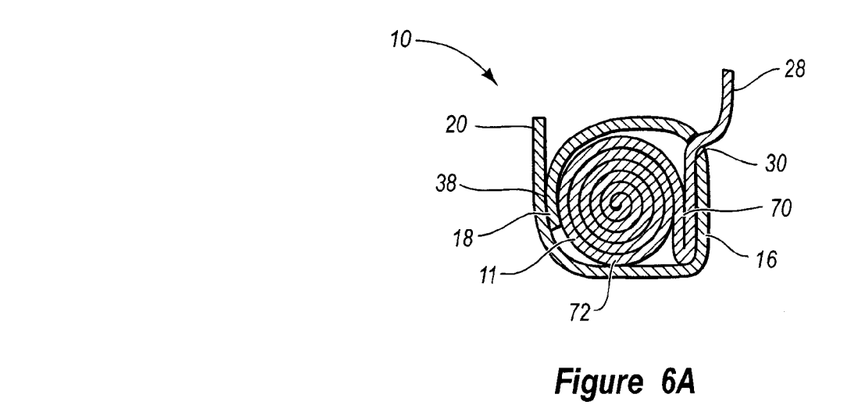
FIG. 6A is a side plan view of the Section 6A—6A of the curtain airbag of FIG. 5.

Referring now to FIG. 3, the airbag device 10 may further include a tether 56 having a first end 58 attached adjacent the first side edge 60 of the curtain 11. A second end 62 of the tether 56 is configured with an anchor 64 to facilitate securing the curtain 11 to an interior of a vehicle.

Referring to FIGS. 4–6a, the method of enclosing the curtain 11 substantially within the wrap 16 according to the present invention is illustrated. The curtain 11 is positioned, in a folded state and the wrap 16 is secured about the curtain 11. The positioning step may include folding the first edge 12 of the curtain 11 to a position adjacent a first 68 side of the curtain 11 to thereby create a fold portion 70. The second end 14 of the curtain 11 may then be rolled toward the first edge 12 of the curtain 11 to thereby create a rolled portion 72 of the curtain 11 opposite the fold portion 70

The step of securing the wrap about the curtain may include longitudinally securing the first edge 18 of the wrap 16 about the curtain 11 to the second edge 20 of the wrap 16 at the securement portion 38. In a preferred embodiment where the securement portion 38 comprises two-sided tape 38 with the first side 40 of the two-sided tape 38 being secured to the second edge 20 of the wrap 16 and a second side 42 of the two-sided tape 38 being covered with a backing 44, the securing step may include removing the backing 44 from the second side 42 of the two-sided tape 38 and adhering the second side 42 to the first edge 18 of the wrap 16. The step of securing the wrap 16 about the curtain 11 may also include positioning one or more attachment tabs 28 within corresponding slots 30 in the wrap 16, to allow the attachment tabs 28 to be accessible after the wrap 16 is secured about the curtain. The attachment tabs 28 may then be aligned within corresponding notches 32 configured within the wrap 16. In a presently preferred embodiment, the wrap 16 may be cinched down about the curtain 11 prior to securing the edges 18, 20 of the wrap 16 to each other about the curtain 11.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag device comprising:

an inflatable curtain having a first edge and a second edge; and a wrap having a first edge and a second edge, the wrap configured to at least partially enclose the inflatable curtain wherein the curtain comprises at least one attachment tab extending from the first edge of the curtain, thereby permitting the airbag device to be attached to a vehicle interior, wherein the wrap comprises at least one notch configured to substantially align with the attachment tab when the wrap is secured about the curtain, thereby permitting the attachment to be within the notch.

2. The airbag device of claim 1, wherein the first edge of the curtain is folded to a position adjacent the first side to create a fold portion and wherein the second edge of the curtain is rolled toward the first edge of the curtain to create a rolled portion of the curtain adjacent the fold portion, thereby configuring the curtain in a folded state; and wherein the wrap has a first free edge and a second free edge, the wrap further having an inside surface and an outside surface, wherein the first free edge of the wrap is configured to be attached adjacent the second free edge of the wrap about the curtain when the curtain is in the folded state, wherein the wrap comprises a securement portion to facilitate attachment of the first edge of the wrap adjacent the second edge of the wrap such that the securement portion attaches the inside surface and the outside surface of the wrap in an overlapping configuration, wherein the securement portion comprises two-sided tape, a first side being secured near the second edge of the wrap, and a second side configured to be secured near the first edge of the wrap, and wherein the wrap comprises a tear seam running longitudinally along the wrap.

3. The airbag device of claim 1, wherein the wrap is substantially as long as the curtain.

4. The airbag device of claim 1, wherein the wrap is attached to the curtain.

5. The airbag device of claim 4, wherein the wrap is attached longitudinally to the curtain near the first edge of the curtain.

6. The airbag device of claim 4, wherein the wrap is attached to the curtain adjacent a centerline portion of the wrap.

7. The airbag device of claim 1, wherein the curtain comprises at least one attachment tab extending from the first edge of the curtain, thereby permitting the airbag device to be attached to a vehicle interior.

8. The airbag device of claim 7, wherein the wrap comprises at least one slot configured to receive the attachment tab therethrough.

9. The airbag device of claim 1, wherein the securement portion that attaches the curtain has a tensile strength of at least 500 N.

10. The airbag device of claim 9, wherein the points of attachment of the wrap to the curtain have a tensile strength of about 1400 N.

11. The airbag device of claim 1, wherein the tear seam comprises a tear strength of between about 10 pounds and about 50 pounds under tensile load.

12. The airbag device of claim 11, wherein the tear seam comprises a tear strength of about 30 pounds under tensile load.

13. The airbag device of claim 1, wherein the curtain comprises a plurality of attachment tabs extending from the first edge of the curtain, thereby permitting the curtain airbag to be attached to a vehicle interior.

14. The airbag device of claim 13, wherein the wrap comprises a plurality of slots configured to receive the attachment tabs therethrough.

15. The airbag device of claim 1, wherein the first edge of the wrap is configured to be attached near the second edge of the wrap about the curtain when the curtain is in a folded state.

16. The airbag device of claim 15, wherein the wrap comprises a securement portion to facilitate attachment of the first edge of the wrap adjacent a second edge of the wrap.

17. The airbag device of claim 15, wherein the securement portion comprises two-sided tape, a first side being secured near the second edge of the wrap, and a second side configured to be secured near the first edge of the wrap.

18. The airbag device of claim 16, wherein the securement portion is positioned longitudinally near the second edge of the wrap.

19. The airbag device of claim 17, wherein the two-sided tape is acrylic based.

20. The airbag device of claim 1, wherein the wrap comprises a tear seam running longitudinally along the wrap.

21. The airbag device of claim 20, wherein the tear seam is positioned between the securement portion of the wrap and the first edge of the wrap, and is configured to permit the curtain to burst through the wrap at the tear seam and into a vehicle upon inflation.

22. The airbag device of claim 1, wherein the first edge of the curtain is folded once to a position adjacent the first side to create a fold portion with one fold.

23. An airbag device comprising:

an inflatable curtain having a first edge and a second edge; and a wrap having a first edge and a second edge, the wrap being attached to the curtain, the first edge of the wrap configured to be attached near the second edge of the wrap about the curtain when the curtain is in a folded state, wherein the curtain comprises a plurality of attachment tabs extending from the first edge of the curtain, thereby permitting the curtain airbag to be attached to a vehicle interior wherein the wrap comprises a plurality of notches configured to substantially align with the attachment tab when the wrap is secured about the curtain, thereby permitting the attachment to be within the notch.

24. An inflatable curtain device, comprising:

an inflatable curtain having a first edge and a second edge and a first side, wherein the first edge of the curtain is folded to a position adjacent the first side to create a fold portion and wherein the second edge of the curtain is rolled toward the first edge of the curtain to create a rolled portion of the curtain adjacent the fold portion, thereby configuring the curtain in a folded state; and a wrap comprising a first free edge and a second free edge, the wrap further having an inside surface and an outside surface, the wrap being longitudinally attached adjacent the first edge of the curtain, the wrap further comprising a securement portion longitudinally positioned near the second edge of the wrap to facilitate attachment of the second edge of the wrap adjacent the first edge of the wrap about the curtain when the curtain is in a folded state such that the securement portion attaches the inside surface and the outside surface of the wrap in an overlapping configuration, the wrap further comprising a tear seam running longitudinally along the wrap to allow the curtain to burst through the wrap upon inflation, wherein the curtain comprises at least one attachment tab extending from the first edge of the curtain, thereby permitting the airbag device to he attached to a vehicle interior, wherein the wrap comprises at least one notch configured to substantially align with the attachment tab when the wrap is secured about the curtain, thereby permitting the attachment to be within the notch.

25. The inflatable curtain device of claim 24, wherein the securement portion comprises tape having a first side and a second side, the first side being secured near the first edge of the wrap, and the second side configured to be secured near the second edge of the wrap.

26. The inflatable curtain device of claim 25, in the tape is acrylic based.

27. A method for assembling a curtain airbag device comprising a curtain and a wrap configured to at least partially enclose the curtain, the method comprising:

positioning the curtain in a folded state; and securing the wrap about the curtain, wherein the curtain includes at least one attachment tab and aligning the attachment tab within a corresponding notch configured within the wrap.

28. The method of claim 27, wherein the positioning step comprises folding a first edge of the curtain to a position adjacent a first side of the curtain to thereby create a fold portion.

29. The method of claim 28, wherein the positioning step further comprises rolling a second edge of the curtain toward the first edge of the curtain airbag to thereby create a rolled portion of the air bag opposite the fold portion.

30. The method of claim 27, further comprising the step of cinching the curtain in the folded state prior to attaching the first edge near the second edge.

31. The method of claim 27, wherein the wrap comprises a first free edge and a second free edge, an inside surface and an outside surface, and a tear seam running longitudinally along the wrap to allow the curtain to burst through the wrap upon inflation, and wherein the first free edge is attached near the second free edge of the wrap using two-sided tape in an overlapping configuration such that the inside surface is attached to the outside surface.

32. The method of claim 27, wherein the wrap comprises a securement portion positioned adjacent the first edge of the wrap.

33. The method of claim 32, wherein the step of securing comprises longitudinally securing the first edge of the wrap about the curtain to the second edge of the wrap at the securement portion.

34. The method of claim 33, wherein the securement portion comprises two-sided tape, a first side of the two-sided tape being secured to the second edge of the wrap and a second side of the two-sided type being covered with a liner.

35. The method of claim 34, wherein the step of securing further comprises removing the liner from the second side of the two-sided tape and adhering a second side to the first edge of the wrap.

* * * * *